United States Patent
Zobrist et al.

(10) Patent No.: US 12,524,698 B2
(45) Date of Patent: Jan. 13, 2026

(54) RESETTING QUANTUM STATES OF QUBITS VIA ON-CHIP LOSSY RESONATORS WITHIN QUANTUM COMPUTING SYSTEMS

(71) Applicant: Google LLC, Mountain View, CA (US)

(72) Inventors: Nicholas Reinhard Zobrist, Santa Barbara, CA (US); Kevin Chenghao Miao, Goleta, CA (US); Alexander Matthew Opremcak, Goleta, CA (US); Ofer Naaman, Santa Barbara, CA (US); Theodore Charles White, Goleta, CA (US); Daniel Sank, Goleta, CA (US)

(73) Assignee: GOOGLE LLC, Mountain View, CA (US)

( * ) Notice: Subject to any disclaimer, the term of this patent is extended or adjusted under 35 U.S.C. 154(b) by 124 days.

(21) Appl. No.: 18/456,208

(22) Filed: Aug. 25, 2023

(65) Prior Publication Data
US 2025/0068952 A1    Feb. 27, 2025

(51) Int. Cl.
*G06N 10/40* (2022.01)
(52) U.S. Cl.
CPC .................. *G06N 10/40* (2022.01)
(58) Field of Classification Search
CPC ....................................... G06N 10/40
USPC ................ 257/200, 663, 34, 9, 31; 326/1; 505/190, 170
See application file for complete search history.

(56) References Cited

FOREIGN PATENT DOCUMENTS

WO    WO-2020139407 A1 *  7/2020  ............. G06N 10/00

OTHER PUBLICATIONS

O'Connel et al., "Microwave Dielectric Loss at Single Photon Energies and Millikelvin Temperatures.", arXiv:0802.2404v1, Feb. 18, 2008, 4 pages.

(Continued)

*Primary Examiner* — Arnold M Kinkead
(74) *Attorney, Agent, or Firm* — DORITY & MANNING P.A.

(57) ABSTRACT

A quantum computing system includes a cryogenic chamber and an integrated circuit located in the chamber. The integrated circuit includes a substrate, a qubit formed on the substrate, and a dissipative element that is formed on the substrate and coupled to the qubit. When the qubit is tuned to a first flux value, the integrated circuit is enabled to perform quantum-computation operations on a set of quantum states of the qubit. The quantum states include a ground state and an excited state. When the qubit is tuned to a second flux value, the qubit is enabled to transfer energy associated with the excited state from the qubit to the dissipative element. Upon the energy transfer, the qubit is transitioned to the ground state. The dissipative element is enabled to dissipate the transferred energy to a portion of the substrate.

20 Claims, 5 Drawing Sheets

(56) References Cited

OTHER PUBLICATIONS

Morstedt et al., "Recent Developments in Quantum-Circuit Refrigeration.", arXiv:2111.11234v1, Nov. 22, 2021, 17 pages.
International Search Report and Written Opinion for Application No. PCT/US2024/043700, mailed Apr. 24, 2025, 17 pages.
Sunada et al., "Fast Readout and Reset of a Superconducting Qubit Coupled to a Resonator with an Intrinsic Purcell Filter", American Physical Society, Physical Review Applied 17, Mar. 22, 2022, 12 pages.
Swiadek et al., "Enhancing Dispersive Readout of Superconducting Qubits Through Dynamic Control of the Dispersive Shift: Experiment and Theory", arXiv:2307.07765v1, Jul. 15, 2023, 14 pages.

\* cited by examiner

RESETTING QUANTUM STATES OF QUBITS VIA ON-CHIP LOSSY RESONATORS WITHIN QUANTUM COMPUTING SYSTEMS

FIELD

The present disclosure relates generally to quantum computing and information processing systems, and more particularly to resetting quantum states of multi-state devices (e.g., qubits) via on-chip lossy resonators within quantum computing systems.

BACKGROUND

Quantum computing is a computing method that takes advantage of quantum effects, such as superposition of basis states and entanglement to perform certain computations more efficiently than a classical digital computer. In contrast to a digital computer, which stores and manipulates information in the form of bits, e.g., a "1" or "0," quantum computing systems can manipulate information using quantum bits ("qubits"). A qubit can refer to a quantum device that enables the superposition of multiple states, e.g., data in both the "0" and "1" state, and/or to the superposition of data, itself, in the multiple states. In accordance with conventional terminology, the superposition of a "0" and "1" state in a quantum system may be represented, e.g., as a $|0\rangle + b|1\rangle$ The "0" and "1" states of a digital computer are analogous to the $|0\rangle$ and $|1\rangle$ basis states, respectively of a qubit.

SUMMARY

Aspects and advantages of embodiments of the present disclosure will be set forth in part in the following description, or can be learned from the description, or can be learned through practice of the embodiments.

One example aspect of the present disclosure is directed to a quantum computing system. The quantum computing system includes a cryogenic chamber and an integrated circuit that is integrated on a substrate. The substrate is located within the cryogenic chamber. The integrated circuit includes a first tunable qubit and a first dissipative element that is coupled to the first tunable qubit. When the first tunable qubit is tuned to a first flux value, the integrated circuit is enabled to perform one or more quantum-computation operations on a set of quantum states of the first tunable qubit. The set of quantum states of the first tunable qubit includes at least a ground state and one or more excited states. When the first tunable qubit is tuned to a second flux value, the first tunable qubit is enabled to transfer energy associated with the one or more excited states from the first tunable qubit to the first dissipative element such that the first tunable qubit is transitioned to the ground state. The first dissipative element is enabled to dissipate the energy associated with the one or more excited states to a portion of the substrate.

Other aspects of the present disclosure are directed to various systems, methods, apparatuses, non-transitory computer-readable media, computer-readable instructions, and computing devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
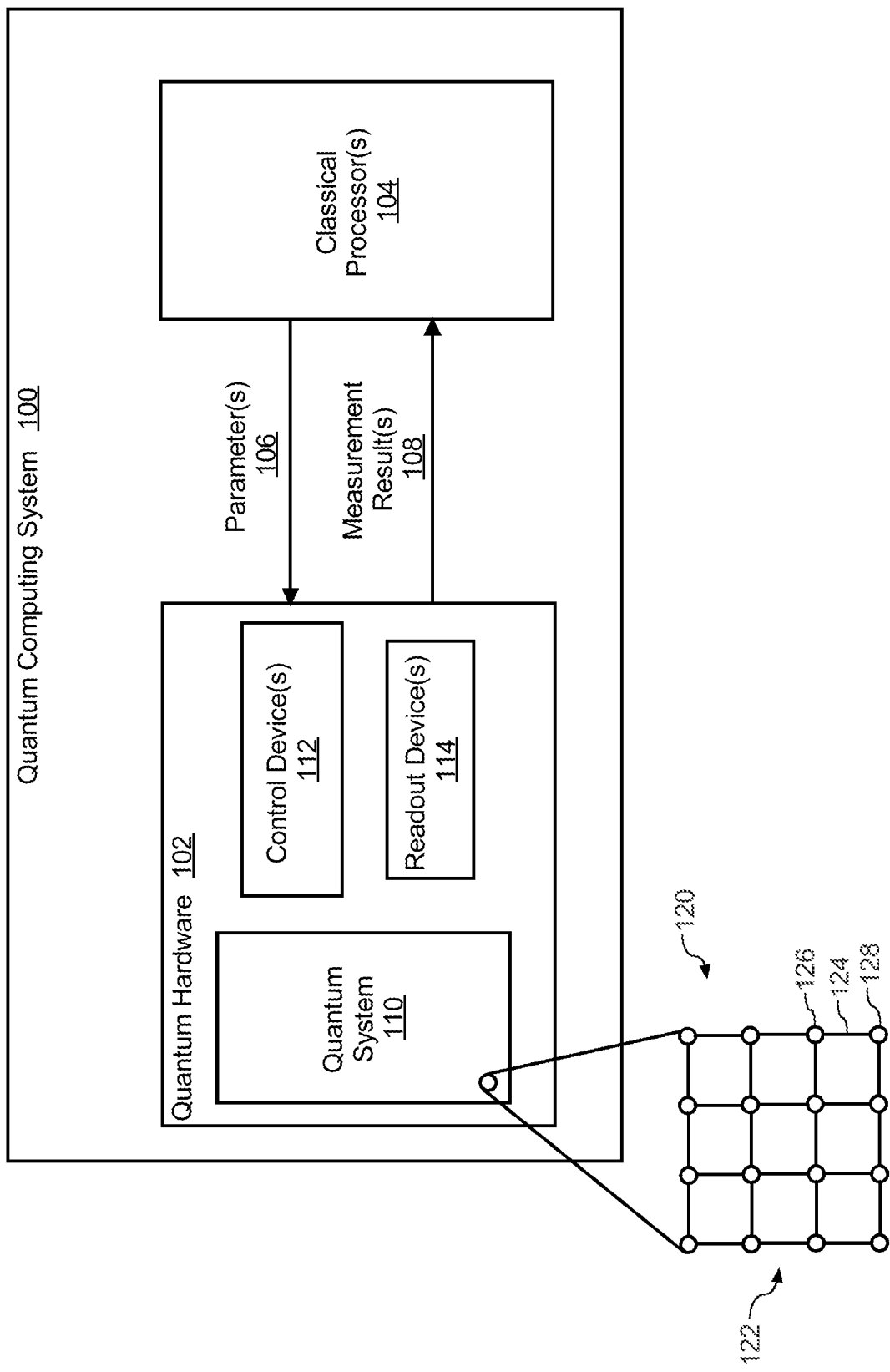
FIG. 1 depicts an example quantum computing system according to example embodiments of the present disclosure.

Example aspects of the present disclosure are directed to methods, architectures, and hardware configurations that enable the resetting of quantum states of qubits via on-chip lossy resonators within quantum computing systems. Quantum error correction (QEC) algorithms that make use of stabilizer measurements (e.g., surface codes) typically involve an array of qubits encoding the quantum information ("data qubits") interspersed with qubits that periodically and repeatedly perform checks on the encoded information ("measure qubits"). These checks may be performed with multi-qubit gates (e.g., fSim gates) between the data and measure qubits, and culminate in measurement of the measure qubits. At the end of measurement, the state of the measure qubits is effectively random, and must be reinitialized before the next round of checks can be performed.

To reinitialize the measure qubits, a qubit reset operation removes excitations associated with excited states (e.g., $|1\rangle$) from the measure qubit and restores the qubit to its ground state (e.g., $|0\rangle$). In some embodiments, the reset operation involves swapping energy associated with qubit excitations (e.g., an energy difference between an excited state and the qubit's ground state) from the qubit to a resonator. Upon transferring energy associated with an excited state to the resonator, the qubit is transitioned to its ground state. In the resonator, the energy associated with the qubit excitations decay since the resonator is coupled to an external environment.

In contrast to the embodiments, previous methods and architectures for resetting a qubit require at least about 160 ns to reset a measure qubit. To achieve a scalable quantum computing system, given errors rates for current qubit implementations, a QEC algorithm would require the measure qubits reset cycle to be about 50 ns, or less. The embodiments achieve about 50 ns (or less) reset cycles, and thus provide for scalable quantum computing systems. Furthermore, these previous qubit reset methods (and architectures) are prone to crosstalk between resonators through their shared coupling to the external environment. In previous architectures, energy-absorbing elements (e.g., resistors) are located "off-chip". That is, in the previous architecture, the energy-absorbing elements are not located on the integrated circuit that includes the qubits. Thus, the qubits must be coupled to the energy-absorbing elements over a distance, via a coupling channel. Furthermore, in these previous architectures, multiple qubits share a common channel and energy-absorbing element, leading to crosstalk.

The embodiments achieve about 50 ns (or less) reset operations and significantly decrease crosstalk by including dissipative resonator (or resonator-like) structures on-chip such that the coupling between the qubits and dissipative resonator (or resonator-like) structures is over a significantly smaller distance than the previous architectures, providing each qubit with a dedicated dissipative resonator-like structure. Throughout, these dissipative resonator (or resonator-like) structures may be referred to as a "lossy resonator," because they enable an energy transfer (e.g., energy stored by a qubit) to the resonator structure, and then are further enabled to dissipate the transferred energy. A lossy resonator may include a "dissipative element" (or dissipative structure), such as but not limited to a resistive element and/or a "lossy" dielectric element. Thus, in some embodiments, each qubit has a dedicated dissipative resonator structure (and coupling channel), such that multiple qubits do not share a common resonator (or a common coupling channel), which reduced crosstalk even more.

More specifically, to reset a qubit, a dissipative element (or structure) is needed to absorb the qubit energy. The previous architectures employ an off-chip resistor as the dissipative element. The resistor is mounted in the cryogenic chamber that houses the superconducting device (e.g., a superconducting chip and/or substrate) implementing the qubits. In some of these previous architectures, the off-chip resistor is located about 10 inches (or more) from the chip implementing the qubits (and quantum logic gates). In these previous architectures, multiple qubits may share access to this dissipative resistor because of space and wire routing constraints that limit the number of wires per qubit that can leave the chip. Crosstalk during reset happens because of this shared channel (e.g., a wire) which can allow amounts of energy exchange between qubits.

The embodiments solve the crosstalk problem by moving the dissipative element onto the qubit chip, allowing each qubit to have its own dissipative element. In some embodiments, each qubit may be coupled to its separate on-chip dissipative element via a separate coupling channel (e.g., a wire). In some embodiments, a lossy dielectric can be fabricated into a stripline or microstrip geometry on the chip. Such techniques are compatible with existing microwave wiring on the qubit chip and are fashionable into a microwave resonator that can be used for qubit reset. In other embodiments, a metal resistor can be fabricated on the chip, via a metallization layer, and can serve as the dissipative element.

For instance, various embodiments of a quantum computing system include a cryogenic chamber and a superconducting device located within the cryogenic chamber. The superconducting device may be a substrate in various embodiments (e.g., a superconducting and/or a semiconductor substrate). The superconducting device may be a superconductor chip (or a substrate) that implements quantum devices (e.g., qubits, qubit couplers, and the like). Thus, the superconducting device (or substrate) may integrate various quantum circuit elements to form a quantum integrated circuit. Throughout, a quantum logic circuit may be referred to as an integrated circuit. Also throughout, a quantum logic circuit (e.g., an integrated circuit) may be integrated on the superconducting device (e.g., a chip and/or a substrate). The substrate may be located in a cryogenic chamber of the quantum computing system.

The quantum logic circuit (or integrated circuit) may be enabled to perform and/or implement quantum-computation operations (on the qubits included on the superconducting device) that are associated with a quantum logic gate (e.g., single-qubit quantum-computation operations and/or multi-qubit quantum-computation operations). For instance, the quantum logic circuit may be enabled implement a single-qubit quantum logic gate that performs quantum-computation operations (e.g., Pauli X,Y,Z operations, a Hadamard operation, and the like) on each qubit. A single-qubit quantum logic gate (for a qubit) may be implemented by the quantum logic circuit by providing the qubit with one or more control signals (e.g., a microwave signal). The quantum logic circuit may be enabled implement a multi-qubit quantum logic gate that performs quantum-computation operations (e.g., CNOT, CZ, SWAP, Toffoli, and the like) on pairs of qubits. A qubit coupler (included in the quantum logic circuit) may be employed to implement an fSim gate (e.g., a generalized multi-qubit quantum logic gate) for a pair of qubits. Thus, although a quantum logic circuit need not include a physical quantum logic gate, it may be said that a quantum logic circuit may implement a quantum logic gate, via various elements (e.g., qubit couplers) and/or operations (e.g., providing one or more control signals to the qubits). Thus, it may be said that the quantum logic circuit may implement one or more quantum logic gate operations (e.g., quantum-computations operations) on the qubits. A quantum logic circuit may perform one or more quantum-computation operations on a set of quantum states for each qubit.

A quantum logic circuit may include at least a first qubit, and a first dissipative element. The first dissipative element may be coupled to the first qubit. In various embodiments, the first qubit may be a transmon qubit. Thus, the qubit may be implemented by one or more Josephson junctions on the chip. A Josephson junction has a loop structure, where various properties and/or characteristics of the qubit may be varied by tuning the magnetic flux across the loop structure. Thus, the first qubit may be a first tunable qubit. For instance, a frequency band associated with the qubit's (computational and non-computational) states may be shifted by tuning a magnetic flux across the loop structure. Thus, in some embodiments, when the first tunable qubit is tuned to a first flux value, the quantum logic circuit (via implementing a quantum logic gate and/or or a quantum logic gate operation) is enabled to perform one or more quantum-computation operations on a set of quantum states of the first tunable qubit. The set of quantum states may include at least a ground state and one or more excited states (e.g., the qubit's computational states). The set of quantum states may include additional excited states (e.g., non-computational states). A qubit reset operation may include tuning the first qubit to a second flux value. When the first qubit is tuned to the second flux value, the first qubit is enabled to transfer energy associated with the one or more excited states from the first tunable qubit to the first dissipative element such that the first tunable qubit is transitioned to the ground state, i.e., a qubit reset operation is performed. The on-chip first dissipative element is enabled to dissipate the energy associated with the one or more excited states to a portion of the superconducting device.

In various embodiments, the first dissipative element is part of a first resonator structure included in the integrated circuit. The first resonator structure is coupled to the first qubit. The first resonator may be coupled to the first qubit via a first filter structure of the integrated circuit. The first filter may be enabled to transfer the energy associated with the one or more excited states from the first qubit to the first resonator. The first filter may be a lossless resonator such that the transfer of the energy associated with the one or more excited states from the first tunable qubit to the first resonator is essentially a lossless energy transfer. Due to the inclusion of the first dissipative element, the first resonator may be a lossy resonator. The first resonator may include a first capacitor, a first inductor, and the first dissipative element. The first filter may include a second capacitor and a second inductor.

The first filter may be coupled to the first qubit via a first coupling element. The first resonator may be coupled to the first filter via a second coupling element. In various embodiments, the first coupling element may be a capacitor and the second coupling element may be another capacitor. In other embodiments, the first coupling element may be an inductor and the second coupling element may be another inductor. In still other embodiments, the coupling elements may include various combinations of capacitors and inductors. The first filter may be coupled to a ground source and the first resonator may also be coupled to the ground source.

In various embodiments, the first filter is a coplanar waveguide (CPW) resonator that is fabricated via (or includes) a coplanar waveguide (CPW) trace on the superconducting device (or substrate). The first resonator may be a stripline resonator. In some embodiments, the first dissipative element may be fabricated via (or includes) a stripline trace on the superconducting device (or substrate). In other embodiments, the first resonator may be a microstrip resonator and the first dissipative element may be fabricated via (or includes) a microstrip trace on the superconducting device. In some embodiments, the first dissipative element may include a lossy dielectric material. The lossy dielectric material may be deposited on the superconducting device (or substrate). In other embodiments, the first dissipative element may include a metal resistor. The metal resistor may be included in a metallization layer on the superconducting device (or substrate). In still other embodiments, the first dissipative element may include a combination of resistors and lossy dielectric materials.

In various embodiments may include multiple qubits, multiple dissipative elements (included in multiple lossy resonators), and multiple coupling channels that couple the qubits to the lossy resonators. In such embodiments, there may be a separate dissipative element (and thus a separate resonator) and a separate coupling channel (e.g., a wire) for each qubit. For example, the integrated circuit may include a set of qubits, a set of coupling channels, and a set of lossy resonators. Each lossy resonator of the set of lossy resonators may include a dissipative element (e.g., a lossy dielectric and/or a resistor). Thus, the integrated circuit may include a set of dissipative elements. The set of qubits may include at least the first qubit and a second qubit. The set of coupling channels may include at least a first coupling channel and a second coupling channel. The tunable qubit is coupled to the first dissipative element via the first coupling channel. The set of dissipative elements includes at least the first dissipative element and a second dissipative element that is coupled to the second qubit via the second coupling channel. In such embodiments, each qubit of the set of tunable qubits may be coupled to a separate dissipative element of the set of dissipative elements via a separate coupling channel of the set of coupling elements such that a propensity of crosstalk between the coupling channels of the set of coupling channels is decreased. As noted above, each dissipative element of the set of dissipative elements may be included in a separate lossy resonator of a set of lossy resonators.

The first qubit may be a measure qubit included in a logical qubit of a quantum error correction (QEC) code (e.g., a surface code) of the quantum computing system. As noted above, the first qubit (and each qubit in the set of qubits) may be a transmon qubit that has a superconducting loop. The first flux value may include a first magnetic flux through the superconducting loop. The second flux value may include a second magnetic flux through the superconducting loop. The first flux value may be associated with a first frequency band corresponding to one or more quantum-computation operations. The second flux value may be associated with a second frequency band corresponding to a readout operation of the first tunable qubit. A first central frequency of the first frequency band may be greater than a second central frequency of the second frequency band.

Aspects of the present disclosure provide a number of technical effects and benefits. For instance, by locating lossy resonators on-chip, each qubit has its own resonators to transfer energy to during a qubit reset. This one-to-one correspondence between qubits and lossy resonators significantly reduces crosstalk when resetting a qubit. Furthermore, by locating the lossy resonators on-chip, the embodiments significantly reduce the time associated with resetting a qubit.

As used herein, the use of the term "about" in conjunction with a numerical value refers to within 10% of the stated amount.

FIG. 1 depicts an example quantum computing system 100, according to various embodiments. The system 100 is an example of a system of one or more classical computers and/or quantum computing devices in one or more locations, in which the systems, components, and techniques described below can be implemented. Those of ordinary skill in the art, using the disclosures provided herein, will understand that other quantum computing devices or systems can be used without deviating from the scope of the present disclosure.

The system 100 includes quantum hardware 102 in data communication with one or more classical processors 104. The classical processors 104 can be configured to execute computer-readable instructions stored in one or more memory devices to perform operations, such as any of the operations described herein. The quantum hardware 102 includes components for performing quantum computation. For example, the quantum hardware 102 includes a quantum system 110, control device(s) 112, and readout device(s) 114 (e.g., readout resonator(s)). The quantum system 110 can include one or more multi-level quantum subsystems, such as a register of qubits (e.g., qubits 120). In some implementations, the multi-level quantum subsystems can include superconducting qubits, such as flux qubits, charge qubits, transmon qubits, gmon qubits, spin-based qubits, and the like.

The type of multi-level quantum subsystems that the system 100 utilizes may vary. For example, in some cases it may be convenient to include one or more readout device(s) 114 attached to one or more superconducting qubits, e.g., transmon, flux, gmon, xmon, or other qubits. In other cases, ion traps, photonic devices or superconducting cavities (e.g., with which states may be prepared without requiring qubits) may be used. Further examples of realizations of multi-level quantum subsystems include fluxmon qubits, silicon quantum dots or phosphorus impurity qubits.

Quantum circuits may be constructed and applied to the register of qubits included in the quantum system 110 via multiple control lines that are coupled to one or more control devices 112. Example control devices 112 that operate on the register of qubits can be used to implement quantum gates or quantum circuits having a plurality of quantum gates, e.g., Pauli gates, Hadamard gates, controlled-NOT (CNOT) gates, controlled-phase gates, T gates, multi-qubit quantum gates, coupler quantum gates, etc. The one or more control devices 112 may be configured to operate on the quantum system 110 through one or more respective control parameters (e.g., one or more physical control parameters). For example, in some implementations, the multi-level quantum subsystems may be superconducting qubits and the control devices 112 may be configured to provide control pulses to control lines to generate magnetic fields to adjust the frequency of the qubits.

The quantum hardware 102 may further include readout devices 114 (e.g., readout resonators). Measurement results 108 obtained via measurement devices may be provided to the classical processors 104 for processing and analyzing. In some implementations, the quantum hardware 102 may include a quantum circuit and the control device(s) 112 and readout devices(s) 114 may implement one or more quantum logic gates that operate on the quantum system 102 through physical control parameters (e.g., microwave pulses) that are sent through wires included in the quantum hardware 102. Further examples of control devices include arbitrary waveform generators, wherein a DAC (digital to analog converter) creates the signal.

The readout device(s) 114 may be configured to perform quantum measurements on the quantum system 110 and send measurement results 108 to the classical processors 104. In addition, the quantum hardware 102 may be configured to receive data specifying physical control qubit parameter values 106 from the classical processors 104. The quantum hardware 102 may use the received physical control qubit parameter values 106 to update the action of the control device(s) 112 and readout devices(s) 114 on the quantum system 110. For example, the quantum hardware 102 may receive data specifying new values representing voltage strengths of one or more DACs included in the control devices 112 and may update the action of the DACs on the quantum system 110 accordingly. The classical processors 104 may be configured to initialize the quantum system 110 in an initial quantum state, e.g., by sending data to the quantum hardware 102 specifying an initial set of parameters 106.

In some implementations, the readout device(s) 114 can take advantage of a difference in the impedance for the $|0\rangle$ and $|1\rangle$ states of an element of the quantum system, such as a qubit, to measure the state of the element (e.g., the qubit). For example, the resonance frequency of a readout resonator can take on different values when a qubit is in the state $|0\rangle$ or the state $|1\rangle$, due to the nonlinearity of the qubit. Therefore, a microwave pulse reflected from the readout device 114 carries an amplitude and phase shift that depend on the qubit state. In some implementations, a Purcell filter can be used in conjunction with the readout device(s) 114 to impede microwave propagation at the qubit frequency.

In some embodiments, the quantum system 110 can include a plurality of qubits 120 arranged, for instance, in a two-dimensional grid 122. For clarity, the two-dimensional grid 122 depicted in FIG. 1 includes 4×4 qubits, however in some implementations the system 110 may include a smaller or a larger number of qubits. In some embodiments, the multiple qubits 120 can interact with each other through multiple qubit couplers, e.g., qubit coupler 124. The qubit couplers can define nearest neighbor interactions between the multiple qubits 120. In some implementations, the strengths of the multiple qubit couplers are tunable parameters. In some cases, the multiple qubit couplers included in the quantum computing system 100 may be couplers with a fixed coupling strength.

In some implementations, the multiple qubits 120 may include data qubits, such as qubit 126 and measurement qubits, such as qubit t. A data qubit is a qubit that participates in a computation being performed by the system 100. A measurement qubit is a qubit that may be used to determine an outcome of a computation performed by the data qubit. That is, during a computation an unknown state of the data qubit is transferred to the measurement qubit using a suitable physical operation and measured via a suitable measurement operation performed on the measurement qubit.

In some implementations, each qubit in the multiple qubits 120 can be operated using respective operating frequencies, such as an idling frequency and/or an interaction frequency and/or readout frequency and/or reset frequency. The operating frequencies can vary from qubit to qubit. For instance, each qubit may idle at a different operating frequency. The operating frequencies for the qubits 120 can be chosen before a computation is performed.

FIG. 1 depicts one example quantum computing system that can be used to implement the methods and operations according to example aspects of the present disclosure. Other quantum computing systems can be used without deviating from the scope of the present disclosure.

Figure 2:
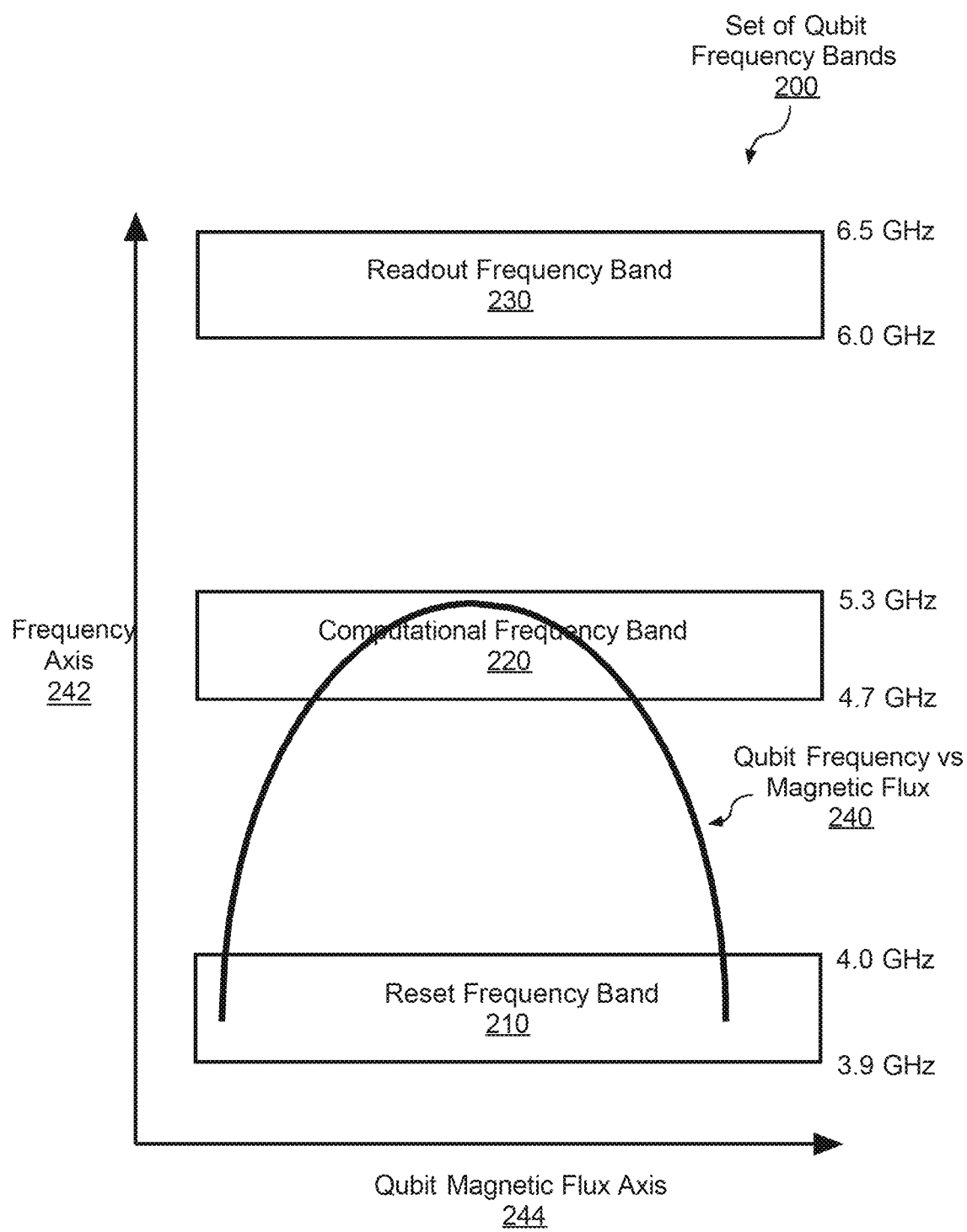
FIG. 2 depicts a set of qubit frequency bands, according to various embodiments.

FIG. 2 depicts a set of qubit frequency bands 200, according to various embodiments. More particularly, the vertical axis in FIG. 2 is a frequency axis 242. The horizontal axis in FIG. 2 is a qubit magnetic flux axis 244. Three qubit frequency bands are included in the set of qubit frequency bands 200. The three qubit frequency bands include: a reset and readout frequency band 220, a computational frequency band 220, and a readout frequency band 230. The three bands are shown vertically stacked, along the vertical frequency axis 242, corresponding to the range of frequencies within the frequency band. The frequencies within the reset frequency band 210 are lower than the frequencies within the computational frequency band 220 and the readout frequency band 230. The frequencies within the computational frequency band 220 are lower than the frequencies within the readout frequency band 230, but higher than the frequencies within the reset frequency band 210. The frequencies within the readout frequency band 230 are greater than the frequencies in the computational frequency band 220 and the reset frequency band 210. In various embodiments, the readout frequency band 230 represents the frequency band where readout resonator frequencies are. Readout is performed when the qubit is tuned to the computational band 220 via dispersive coupling between the qubit and the (higher frequency) resonators Non-limiting values for the upper and lower bounds on each of the qubit frequency bands are shown. In the non-limiting example of FIG. 2, the reset frequency band 210 includes qubit frequencies between 3.9 GHz and 4.0 GHz. In the non-limiting example of FIG. 2, the computational frequency band 220 includes qubit frequencies between 4.7 GHz and 5.3 GHz. In the non-limiting example of FIG. 2, the readout frequency band 230 includes readout resonator frequencies between 6.0 GHz and 6.5 GHz. Note that these are non-limiting example values, and the lower and upper bounds on each of the qubit frequency bands may vary across the embodiments. Although the frequency values may vary, the readout frequency band 230 is typically the highest frequency band, while the reset frequency band 210 is generally the lowest frequency band in the embodiments. Although the frequency bands are shown without overlap in their included frequencies, in various embodiments, some overlap between the frequency bands may be present.

As noted above, qubits of the various embodiments may be transmon qubits. Thus, a qubit may be implemented by one of more Josephson junctions on a superconducting device. A Josephson junction has a loop structure, where various properties and/or characteristics of the qubit may be varied by tuning the magnetic flux across the loop structure. Thus, a qubit may be a tunable qubit. For instance, a frequency band associated with the qubit's (computational and non-computational) states may be shifted by tuning a magnetic flux across the loop structure. FIG. 2 additionally shows an example qubit frequency vs. magnetic flux curve 240. Note how the qubit frequency vs. magnetic flux curve 240 is positioned with respect to the horizontal qubit magnetic flux axis 244 and the vertical frequency axis 242. Also note that the qubit frequency vs. magnetic flux curve 240 is a non-limiting example, and the curve may be subjected to various affine transformations in the various embodiments.

The qubits of the various embodiments are typically operated in the frequencies of the domain of the qubit frequency vs magnetic flux curve 240 of FIG. 2. Thus, the tunable qubits are generally operated (via tuning of the qubits) in the reset frequency band 210 and the computational frequency band 220. When a qubit is operated in the computational frequency band 220, a quantum logic gate (located on the superconducting device) may perform quantum operations on the qubit. Thus, when a qubit is operated in the computational frequency band 220, the qubit is available for quantum computations, e.g., one or more quantum logic operations may be performed on the qubit. In the various embodiments, when the qubit is operated in the Furthermore, in the embodiments, when a quantum state of a qubit (e.g., a measure qubit in a quantum error correction (QEC) code) is measured (e.g., readout) and reset, the qubit is operated at a magnetic flux that places the frequency of the qubit in the reset frequency band 210. Thus, when a qubit is tuned to a first flux value (e.g., a flux value corresponding to the computational frequency band 220), the quantum circuit is enabled is enabled to perform one or more quantum-computation operations on a set of quantum states of the qubit, e.g., by implementing operations associated with a quantum logic gate. The set of quantum states includes at least two computational states (e.g., a ground state and a first excited state). In some embodiments, the set of quantum states may include non-computational states (e.g., additional excited states). As described below, when the qubit is tuned to a second flux value (e.g., a flux value corresponding to the reset frequency band 210), the qubit is enabled to transfer energy associated with the one or more excited states from the qubit to the dissipative element (e.g., a dissipative element included in a lossy resonator located on the same superconducting device). When the energy is transferred from the qubit to the dissipative element, the quantum state of the qubit is transitioned to the ground state. Accordingly, the qubit has been reset. Furthermore, as also discussed below, the dissipative element is enabled to dissipate the energy associated with the one or more excited states to a portion of the superconducting device. In contrast to the embodiment, in order to readout the qubit, previous architectures operated the qubit in the readout frequency band 230.

Figure 3:
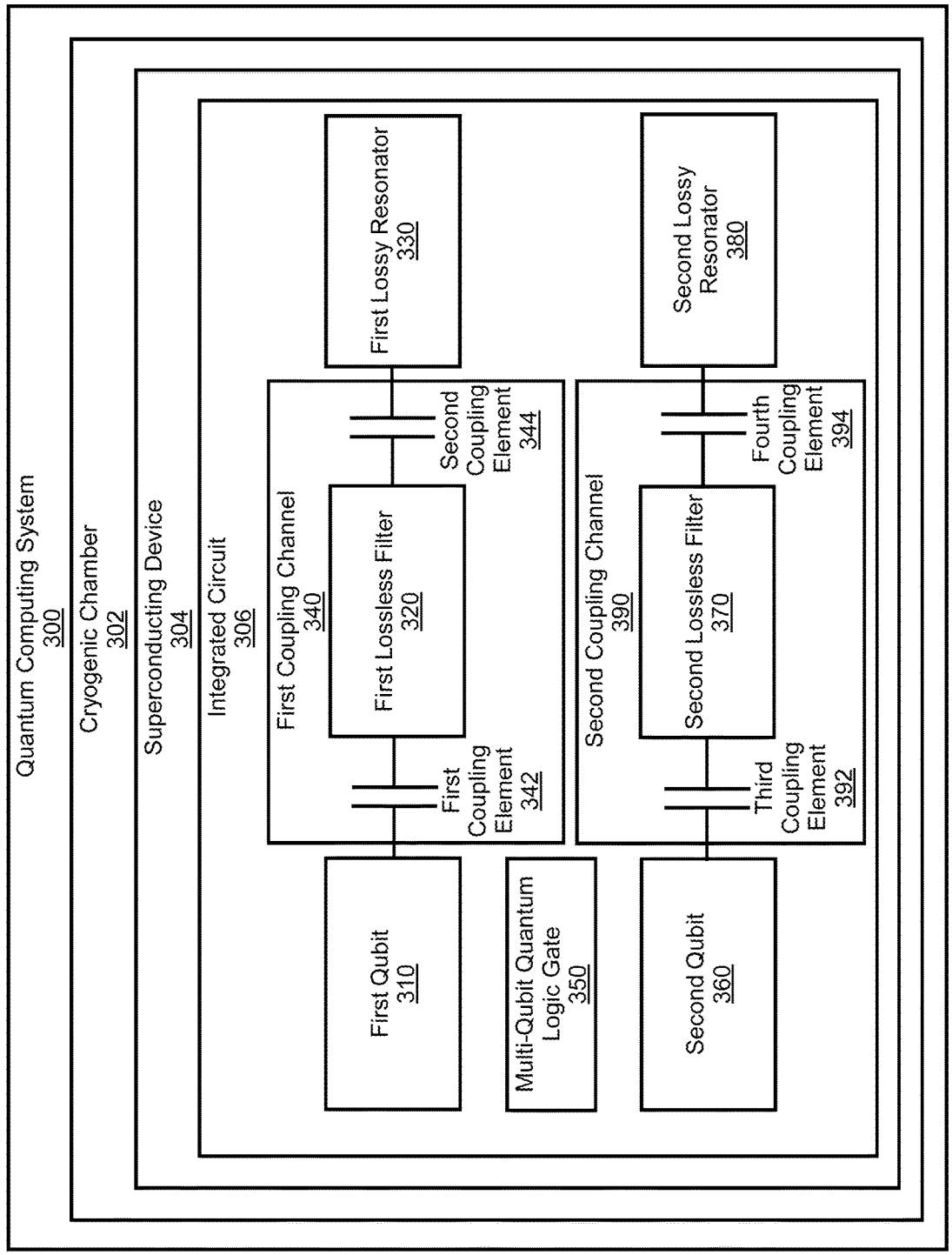
FIG. 3 depicts an example quantum computing system, according to various embodiments.

FIG. 3 depicts an example quantum computing system 300, according to various embodiments. More particularly, FIG. 3 depicts a block diagram on components included in an integrated circuit 306 integrated on a superconducting device 304 of the quantum computing system 300. Quantum computing system 300 may be similar to quantum computing system 100 of FIG. 1.

Quantum computing system 300 includes a cryogenic chamber 302. Quantum computing system 300 further includes the integrated circuit 306 that is integrated on the superconducting device 304. The superconducting device 304 is located (or positioned) within the cryogenic chamber 302. The superconducting device 304 may be a substrate, a chip, or a die. In various embodiments, the superconducting device 304 may be a semiconductor device (e.g., a semiconductor substrate or die). The integrated circuit 306 includes a set of qubits. The set of qubits may include a first qubit 310 (e.g., a first tunable qubit). The set of qubits may additionally include a second qubit 360 (e.g., a second tunable qubit). The integrated circuit 306 may implement a quantum logic gate (e.g., multi-qubit quantum logic gate 350), which is enabled to perform quantum logic operations on at least the first qubit 310 and the second qubit 360. In some embodiments, the operations of the implemented multi-qubit quantum logic gate 350 may perform entangling operations of the qubit pair consisting of the first qubit 310 and the second qubit 360. As discussed above, multi-qubit quantum logic gate 350 may not be a physical device included in the integrate circuit 306. Rather, the multi-qubit quantum logic gate 350 may be implemented via a qubit coupler included in the integrated circuit 306 (which is not shown in FIG. 3) and/or one or more control signals provided to the first qubit 310 and/or the second qubit 360. Accordingly, although it is shown as a discrete physical device on FIG. 3, multi-qubit quantum logic gate 350 may not be a physical element, but rather an implementable set of operations that may operate on the first qubit 310 and/or the second qubit 360. Via implementing the multi-qubit quantum logic gate 350, the integrated circuit 306 may be enabled to perform one or more quantum-computation operations on the first qubit 310 and/or the second qubit 360.

The integrated circuit 306 may include a first lossy resonator 330. Although not shown explicitly in FIG. 3, the first lossy resonator 330 may include a first dissipative element. For instance, see first dissipative element 432 in first lossy resonator 430 of FIG. 3. The first lossy resonator 330 may be coupled to the first qubit 310 via a first coupling channel 340. Likewise, the integrated circuit 306 may include a second lossy resonator 380 that is coupled to the second qubit 360 via a second coupling channel 390. The second lossy resonator 380 may include a second dissipative element (not shown in FIG. 3). The first lossy resonator 330 and the second lossy resonator 380 may be similar to the first lossy resonator 430 of FIG. 4. The first coupling channel 340 and the second coupling channel 390 may include separate wires (or conductive traces) that at least partially couple the qubits to their respective lossy resonators. As shown in FIG. 3, lossless filters (e.g., first lossless filter 320 and second lossless filter 370) may exist between the qubits and their lossy resonators.

As discussed below, the integrated circuit 306 may include a first lossless filter 320 and a second lossless filter 370. The first lossless filter 320 and the second lossless filter 370 may be similar to first lossless filter 420 of FIG. 4. However, briefly here, the first lossless filter 320 may be coupled to the first qubit 310 via a first coupling element 342. The first lossless filter 320 may be coupled to the first lossy resonator 330 via a second coupling element 344. The second lossless filter 370 may be coupled to the second qubit 360 via a third coupling element 392. The second lossless filter 370 may be coupled to the second lossy resonator 380 via a fourth coupling element 394. The coupling elements are shown as capacitors in FIG. 3. However, the embodiments are not so limited, and the coupling elements may include one or more inductors. The lossless filters may be enabled to losslessly transfer energy between their qubits and their lossy resonators within a frequency band that the lossless filters (and lossy resonators) are tuned for, while blocking energy transfers outside the frequency bands of the lossless filters.

As noted in conjunction with FIG. 2, when the first qubit 310 is tuned to a first flux value (e.g., a flux value on the qubit frequency vs. magnetic curve 240 of FIG. 2 that corresponds to the computational frequency band 220 of FIG. 2), the integrated circuit 306 is enabled to perform one or more quantum-computation operations on a set of quantum states of the first qubit 310, via implementing a quantum logic gate (e.g., multi-qubit quantum logic gate 350). The set of quantum states may include at least a ground state and a first excited state (e.g., the computational states of the first qubit 310). The set of quantum states may include additional excited states (e.g., non-computational states). A first dissipative element (e.g., a dissipative element of the first lossy resonator 330) may be coupled to the first qubit 310. When the first qubit 310 is tuned to a second flux value (e.g., a flux value on the qubit frequency vs. magnetic curve 240 that corresponds to the reset frequency band 210 of FIG. 2), the first qubit 310 is enabled to transfer energy associated with the one or more excited states from the first qubit 310 to the first dissipative element. Upon the energy transfer, the first qubit 310 is transitioned to the ground state. The first dissipative element is enabled to dissipate the energy associated with the one or more excited states to a portion of the superconducting device 304.

Likewise, when the second qubit 360 is tuned to a third flux value (e.g., a flux value on the qubit frequency vs. magnetic curve 240 that corresponds to the computational frequency band 220), the integrated circuit 306 is enabled to perform one or more quantum-computation operations on a set of quantum states of the second qubit 360, via implementing a quantum logic gate (e.g., multi-qubit quantum logic gate 350). A second dissipative element (e.g., a dissipative element of the second lossy resonator 380) may be coupled to the second qubit 360. When the first qubit 360 is tuned to a fourth flux value (e.g., a flux value on the qubit frequency vs. magnetic curve 240 that corresponds to the reset frequency band 210), the second qubit 360 is enabled to transfer energy associated with the one or more excited states from the second qubit 360 to the second dissipative element. Upon the energy transfer, the second qubit 360 is transitioned to the ground state. The second dissipative element is enabled to dissipate the energy associated with the one or more excited states to a portion of the superconducting device 304.

In various embodiments, the integrated circuit 306 includes a set of tunable qubits that includes at least the first qubit 310 and the second qubit 360. The integrated circuit 306 may further include a set of coupling channels. The set of coupling channels includes at least the first coupling channel 340 and the second coupling channel 390. The first qubit 310 is coupled to a first dissipative element (of the first lossy resonator 330) via the first coupling channel 340. The integrated circuit 306 may further include a set of dissipative elements. The set of dissipative elements includes at least the first dissipative element and a second dissipative element (e.g., of the second lossy resonator 380). The second dissipative element may be coupled to the second qubit 360 via the second coupling channel 390. Each qubit of the set of tunable qubits is coupled to a separate dissipative element of the set of dissipative elements via a separate coupling channel of the set of coupling elements such that a propensity of crosstalk between the coupling channels of the set of coupling channels is decreased.

Figure 4:
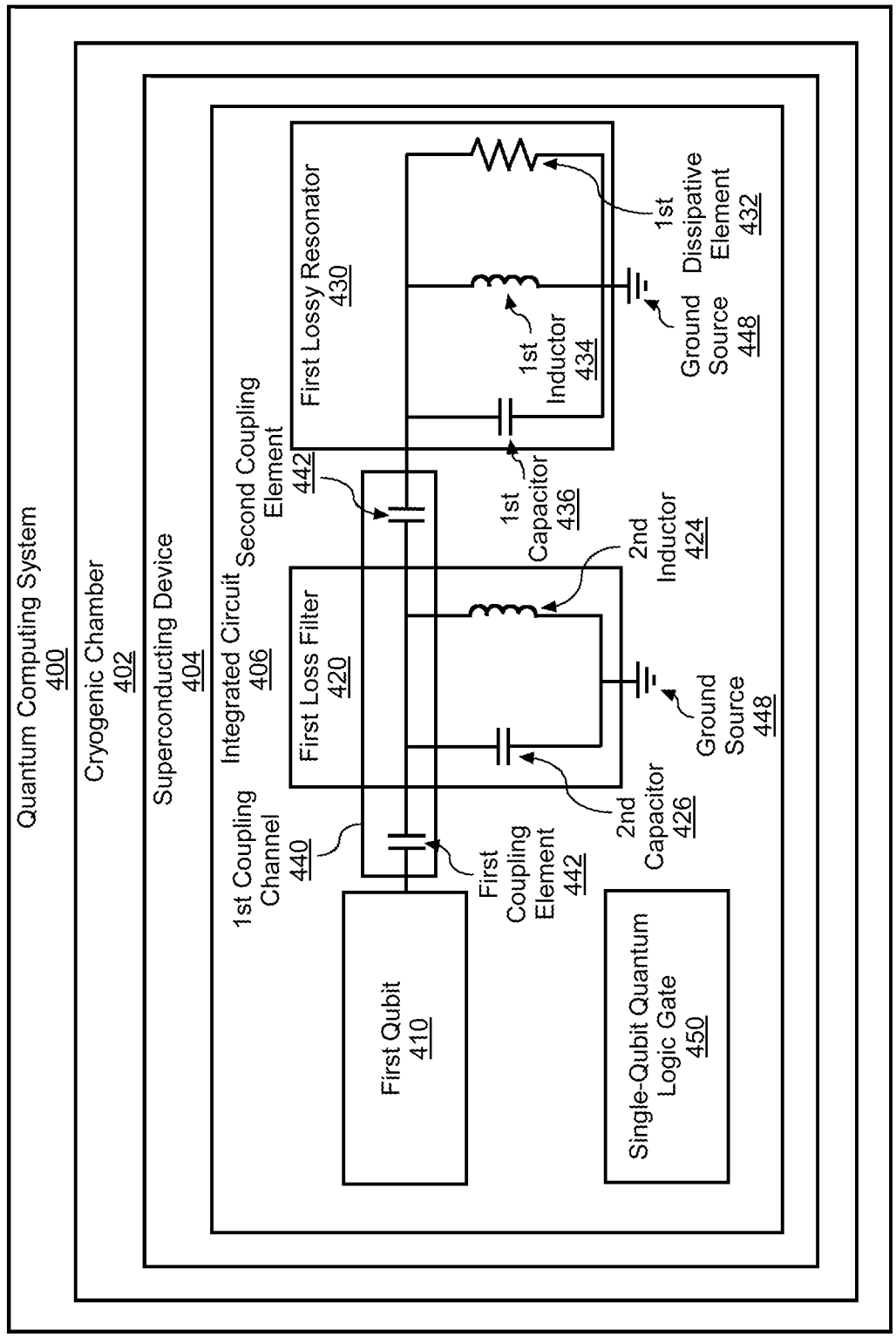
FIG. 4 depicts another example quantum computing system, according to various embodiments.

FIG. 4 depicts another example quantum computing system 400, according to various embodiments. More particularly, FIG. 4 depicts a circuit diagram on components included in an integrated circuit 406 integrated on a superconducting device 404 of the quantum computing system 400. Quantum computing system 400 may be similar to quantum computing system 100 of FIG. 1 and/or quantum computing system 300 of FIG. 3.

Quantum computing system 400 includes a cryogenic chamber 402. Quantum computing system 400 further includes the integrated circuit 406 that is integrated on the superconducting device 404. The superconducting device 404 (e.g., a substrate or chip) is located (or positioned) within the cryogenic chamber 402. The integrated circuit 406 includes a first qubit 410 (e.g., a first tunable qubit). The first qubit 410 may be similar to each of the first qubit 310 of FIG. 3 and the second qubit 360 of FIG. 3. The integrated circuit 406 may implement a quantum logic gate (e.g., single-qubit quantum logic gate 450), which is enabled to perform quantum logic operations on at least the first qubit 410. In some embodiments, the operations of the implemented single-qubit quantum logic gate 450 may perform quantum-computation operations on the quantum states of the first qubit 410. As discussed above, single-qubit quantum logic gate 450 may not be a physical device included in the integrate circuit 406. Rather, the single-qubit quantum logic gate 450 may be implemented via one or more control signals provided to the first qubit 410. Accordingly, although it is shown as a discrete physical device on FIG. 4, single-qubit quantum logic gate 450 may not be a physical element, but rather an implementable set of operations that may operate on the first qubit 410. Via implementing the single-qubit quantum logic gate 450, the integrated circuit 406 may be enabled to perform one or more quantum-computation operations on the first qubit 410.

The integrated circuit 406 may include a first lossy resonator 430. The first lossy resonator 430 includes a first dissipative element 432, a first inductor 434, and a first capacitor 436. As shown in FIG. 4, the first dissipative 432 may be a metal resistor. In other embodiments, the first dissipative element 432 may include a lossy dielectric. The first lossy resonator 430 is coupled to a ground source 448. The first lossy resonator 430 may be similar to each of the first lossy resonator 330 of FIG. 3 and the second lossy resonator 480 of FIG. 3. A coupling channel 440 (e.g., including one or more wires and/or conductive traces) may couple the first qubit 410 to the first lossy resonator 430. The coupling channel 440 may be similar to both of the first coupling channel 340 of FIG. 3 and second coupling channel 390 of FIG. 3.

The integrated circuit 406 may further include a first lossless filter 420. The first lossless filter 420 may be similar to each of the first lossless filter 320 of FIG. 3 and the second lossless filter 370 of FIG. 3. However, briefly, the first lossless filter 420 may include a second inductor 424 and a second capacitor 426. The first lossless filter 420 is coupled to the first qubit 410 via a first coupling element 442. The first lossless filter 420 is coupled to the first lossy resonator 430 via a second coupling element 442. In FIG. 4, the coupling elements are shown as capacitors. However, in other embodiments, the coupling elements may include one or more inductors. The first lossless filter 420 may be enabled to losslessly transfer energy between the first qubit 410 and their first lossy resonator 430 within a frequency band that the first lossless filter 420 (and first lossy resonator 430) are tuned for, while blocking energy transfers outside the frequency bands of the first lossless filter 420.

As noted in conjunction with FIG. 2, when the first qubit 410 is tuned to a first flux value (e.g., a flux value on the qubit frequency vs. magnetic curve 240 of FIG. 2 that corresponds to the computational frequency band 220 of FIG. 2), the integrated circuit 406 is enabled to perform one or more quantum-computation operations on a set of quantum states of the first qubit 410, by implementing a quantum logic gate (e.g., single-qubit logic gate 450). The set of quantum states may include at least a ground state and a first excited state (e.g., the computational states of the first qubit 410). The set of quantum states may include additional excited states (e.g., non-computational states) of the first qubit 410. The dissipative element 432 may be (indirectly) coupled to the first qubit 410. When the first qubit 410 is tuned to a second flux value (e.g., a flux value on the qubit frequency vs. magnetic curve 240 that corresponds to the reset frequency band 210 of FIG. 2), the first qubit 410 is enabled to transfer energy associated with the one or more excited states from the first qubit 410 to the first dissipative element 432. Upon the energy transfer, first qubit 410 is transitioned to the ground state. The first dissipative element 432 is enabled to dissipate the energy associated with the one or more excited states to a portion of the superconducting device 404.

As noted above, the first lossy resonator 430 included in integrated circuit 406 includes the first dissipative element 432. The first resonator 430 is coupled to the first qubit 410. The first lossless filter 420 included in integrated circuit 406 couples the first qubit 410 to the first lossy resonator 430. The first loss filter 420 is enabled to transfer the energy associated with the one or more excited states from the first qubit 410 to the first lossy resonator 430. The first lossless filter 420 may be a lossless resonator such that the transfer of the energy associated with the one or more excited states from the first qubit 410 to the first lossy resonator 430 is a lossless energy transfer. As also noted above, the first lossy resonator 430 includes the first capacitor 436, the first inductor 434, and the first dissipative element 432. The first lossless filter 420 includes the second capacitor 426 and the second inductor 424.

The first lossless filter 420 may be coupled to the first qubit 410 via the first coupling element 442. The first lossy resonator 430 is coupled to the first lossless filter 420 via the second coupling element 444. In various embodiments, the first coupling element 442 and the second coupling element 444 include one or more capacitors. In other embodiments, the first coupling element 442 and the second coupling element 444 include one or more inductors. The first lossless filter 420 is coupled to the ground source 448 and the first lossy resonator 430 is coupled to the ground source 448. In various embodiments, the first dissipative element 432 includes a lossy dielectric material that is deposited on the superconducting device 404. In other embodiments, the first dissipative element 432 includes a metal resistor that is included in a metallization layer on the superconducting device 404.

The first qubit 410 may be a measure qubit included in a logical qubit of a quantum error correction (QEC) code of the quantum computing system 400. The first qubit 410 may be a transmon qubit that has a superconducting loop. The first flux value may include a first magnetic flux through the superconducting loop. The second flux value may include a second magnetic flux through the superconducting loop. The first flux value may be associated with a first frequency band (e.g., the computational frequency band 220 of FIG. 2) corresponding to one or more quantum-computation operations. The second flux value may be associated with a second frequency band (e.g., the reset frequency band 210 of FIG. 2) corresponding to a readout operation of the first qubit 410. A first central frequency of the first frequency band may be greater than a second central frequency of the second frequency band. The first frequency band may include frequencies between 4.7 GHz and 5.3 GHz. The second frequency band may include frequencies between 3.9 GHz and 4.0 GHz, as discussed in conjunction with FIG. 2.

Figure 5A:
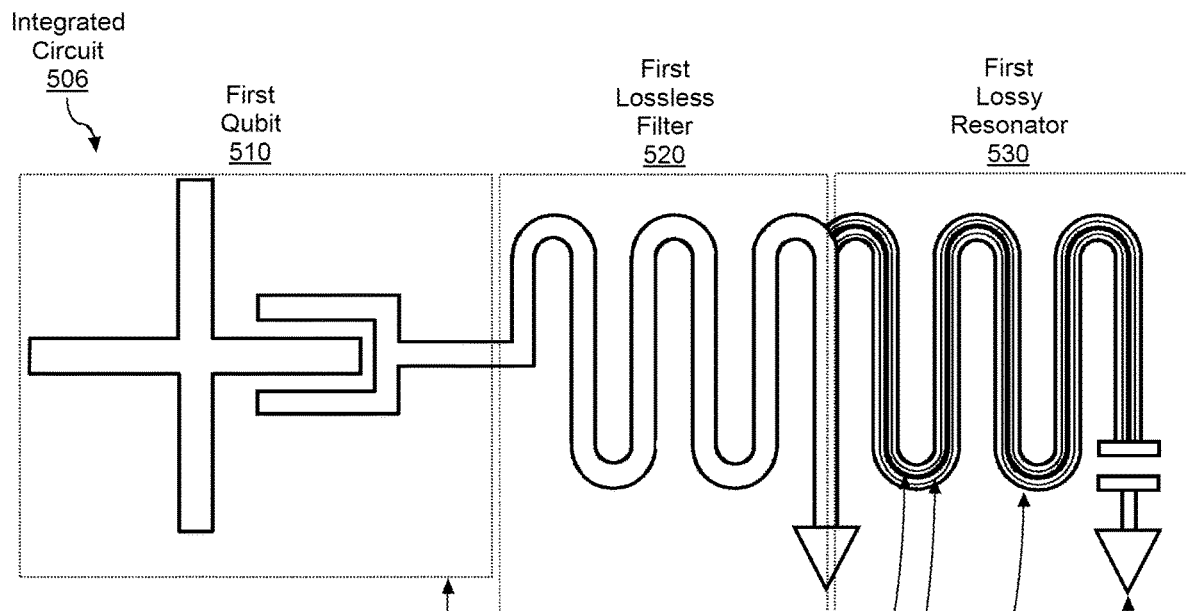
FIGS. 5A-5B provide circuit level diagrams of an integrated circuit, according to various embodiments.
Figure 5B:
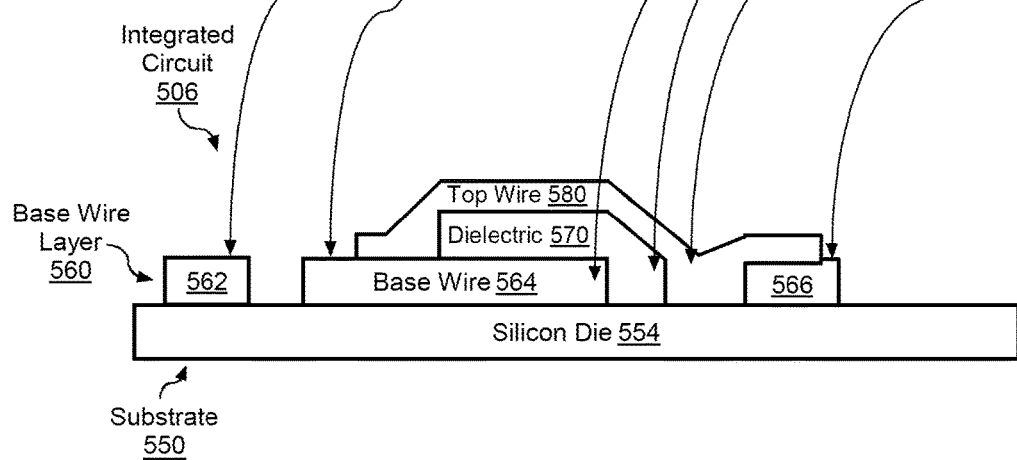

FIGS. 5A-5B provide circuit level diagrams of an integrated circuit 506, according to various embodiments. Integrated circuit 506 of FIGS. 5A-5B may be similar to integrated circuit 306 of FIG. 3 and/or integrated circuit 406 of FIG. 4. More specifically, FIG. 5A provides a top-down view of integrated circuit 506. FIG. 5B provides a side cross-sectional view of integrated circuit 506. Correspondences between the two are shown by the double-ended arrow.

As shown in the top-down view of FIG. 5A, integrated circuit 506 includes a first qubit 510, a first lossless filter 520, and a first lossy resonator 530. First qubit 510 may be similar to first qubit 310 of FIG. 3, second qubit 360 of FIG. 3, and/or first qubit 410 of FIG. 4. First lossless filter 520 may be similar to first lossless filter 320 of FIG. 3, second lossless filter 370 of FIG. 3, and/or first lossless filter 420 of FIG. 4. First lossy resonator 530 may be similar to first lossy resonator 330 of FIG. 3, second lossy resonator 380 of FIG. 3, and/or first lossy resonator 430 of FIG. 4.

Turning attention to the side cross-sectional view of FIG. 5B, the integrated circuit 506 may include a substrate 550, a bare wire layer 560, a dielectric 570 and a top wire 580. The substrate 550 may be a superconducting device (e.g., superconducting device 304 of FIG. 3 and/or superconducting device 404 of FIG. 4. The substrate 550 may include a silicon die 554 (or chip). The embodiments are not so limited, and the substrate 550 may be comprised of one of or more additional and/or alternative semiconductor materials. The integrated circuit 506 may include a base wire layer 560. The base wire layer 560 may be comprised of a first base wire section 562 that corresponds to the first qubit 510, a second base wire section 564 that corresponds to the first lossless filter 520 and an inner portion of the first lossy resonator 530, and a third base wire section 566 that corresponds to a capacitor of the first lossy resonator 530. In non-limiting embodiments, base wire layer 560 may include 100 nm of Al. The integrated circuit 506 may include a dielectric (e.g., a lossy dielectric) that corresponds to a middle portion of the first lossy resonator 530. In non-limiting embodiments, dielectric 570 may include 500 nm of silicon dioxide. The integrated circuit 506 may further include a top wire 580 that corresponds to an outer portion of the first lossy resonator 530. In non-limiting embodiments, the top wire layer 580 may include 200 nm of aluminum. In other embodiments, the top wire layer 580 may be comprised of other conducting materials such as but not limited to gold, copper, silver, platinum, or any other such conductive metallization. In at least one embodiment, the top wire layer 580 may be comprised of non-metallic, but conductive material.

In various embodiments, the first qubit 510 is a transmon tunable qubit. The first lossless filter 520 may be a coplanar waveguide (CPW) filter (or resonator) that is fabricated via a stripline trace on the superconducting device. The first lossy resonator 530 may be a microstrip resonator. The first dissipative element (of the first lossy resonator 53) may be fabricated via a microstrip trace on the superconducting device. In other embodiments, the first lossy resonator 530 is a stripline resonator. The first dissipative element may be fabricated via a stripline trace on the superconducting device.

Other Embodiments

Implementations of the digital, classical, and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital, classical, and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits/qubit structures, or a combination of one or more of them. Alternatively or in addition, the program instructions can be encoded on an artificially-generated propagated signal that is capable of encoding digital and/or quantum information (e.g., a machine-generated electrical, optical, or electromagnetic signal) that is generated to encode digital and/or quantum information for transmission to suitable receiver apparatus for execution by a data processing apparatus.

The terms quantum information and quantum data refer to information or data that is carried by, held, or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states (e.g., qubits) are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, or multiple digital and quantum processors or computers, and combinations thereof. The apparatus can also be, or further include, special purpose logic circuitry, e.g., an FPGA (field programmable gate array), or an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital or classical computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL, Quipper, Cirq, etc.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers or processors to be "configured to" or "operable to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum microprocessors or both, or any other kind of central digital and/or quantum processing unit. Generally, a central digital and/or quantum processing unit will receive instructions and digital and/or quantum data from a read-only memory, or a random access memory, or quantum systems suitable for transmitting quantum data, e.g. photons, or combinations thereof.

Some example elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, or optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more tangible, non-transitory machine-readable storage media, and that are executable on one or more digital and/or quantum processing devices. The systems described in this specification, or portions of them, can each be implemented as an apparatus, method, or electronic system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A quantum computing system comprising:
 a cryogenic chamber; and
 an integrated circuit integrated on a substrate that is located within the cryogenic chamber, the integrated circuit comprising:
  a set of tunable qubits that includes a first tunable qubit, wherein when the first tunable qubit is tuned to a first flux value, the integrated circuit is enabled to perform one or more quantum-computation operations on a set of quantum states of the first tunable qubit that includes at least a ground state and one or more excited states;
  a set of dissipative elements that includes a first dissipative element;
  a set of coupling channels that includes a first coupling channel that couples the first tunable qubit to the first dissipative element;
  a first resonator that includes the first dissipative element, wherein when the first tunable qubit is tuned to a second flux value, the first tunable qubit is enabled to transfer energy associated with the one or more excited states from the first tunable qubit to the first dissipative element such that the first tunable qubit is transitioned to the ground state and the first dissipative element is enabled to dissipate the energy associated with the one or more excited states to a portion of the substrate, and wherein each tunable qubit of the set of tunable qubits is coupled to a separate dissipative element of the set of dissipative elements via a separate coupling channel of the set of coupling elements such that a propensity of crosstalk between coupling channels of the set of coupling channels is decreased.

2. The quantum computing system of claim 1, wherein the first resonator is coupled to the first tunable qubit.

3. The quantum computing system of claim 1, wherein the integrated circuit further comprises:
a first filter that couples the first tunable qubit to the first resonator, wherein the first filter is enabled to transfer the energy associated with the one or more excited states from the first tunable qubit to the first resonator.

4. The quantum computing system of claim 3, wherein the first filter is a lossless resonator such that the transfer of the energy associated with the one or more excited states from the first tunable qubit to the first resonator is a lossless energy transfer and the first resonator is a lossy resonator.

5. The quantum computing system of claim 3, wherein the first resonator includes a first capacitor, a first inductor, and the first dissipative element and the first filter includes a second capacitor and a second inductor.

6. The quantum computing system of claim 3, wherein the first filter is coupled to the first tunable qubit via a first coupling element and the first resonator is coupled to the first filter via a second coupling element.

7. The quantum computing system of claim 6, wherein the first coupling element is a first capacitor and the second coupling element is a second capacitor.

8. The quantum computing system of claim 6, wherein the first coupling element is a first inductor and the second coupling element is a second inductor.

9. The quantum computing system of claim 3, wherein the first filter is coupled to a ground source and the first resonator is coupled to the ground source.

10. The quantum computing system of claim 3, wherein the first filter is a coplanar waveguide (CPW) filter comprising a CPW trace on the substrate.

11. The quantum computing system of claim 1, wherein the first resonator is a stripline resonator and the first dissipative element comprises a stripline trace on the substrate.

12. The quantum computing system of claim 1, wherein the first resonator is a microstrip resonator and the first dissipative element comprises a microstrip trace on the substrate.

13. The quantum computing system of claim 1, wherein the first dissipative element includes a lossy dielectric material that is deposited on the substrate.

14. The quantum computing system of claim 1, wherein the first dissipative element includes a metal resistor that is included in a metallization layer on the substrate.

15. The quantum computing system of claim 1, wherein the set of tunable qubits further includes a second tunable qubit;
the set of coupling channels further includes a second coupling channel; and
the set of dissipative elements further includes a second dissipative element that is coupled to the second tunable qubit via the second coupling channel.

16. The quantum computing system of claim 1, wherein the first tunable qubit is a measure qubit included in a logical qubit of a quantum error correction (QEC) code of the quantum computing system.

17. The quantum computing system of claim 1, wherein the first tunable qubit is a transmon qubit that has a superconducting loop, the first flux value includes a first magnetic flux through the superconducting loop, and the second flux value includes a second magnetic flux through the superconducting loop.

18. The quantum computing system of claim 1, wherein the first flux value is associated with a first frequency band corresponding to one or more quantum-computation operations and the second flux value is associated with a second frequency band corresponding to a readout operation of the first tunable qubit, and a first central frequency of the first frequency band is greater than a second central frequency of the second frequency band.

19. The quantum computing system of claim 18, wherein the first frequency band includes frequencies between about 4.7 GHZ and about 5.3 GHZ and the second frequency band includes frequencies between about 3.9 GHZ and about 4.0 GHz.

20. An integrated circuit comprising:
a substrate;
a set of tunable qubits that includes a first tunable qubit formed on the substrate, wherein when the first tunable qubit is tuned to a first flux value, the integrated circuit is enabled to perform one or more quantum-computation operations on a set of quantum states of the first tunable qubit that includes at least a ground state and one or more excited states;
a set of dissipative elements that includes a first dissipative element formed on the substrate;
a set of coupling channels that includes a first coupling channel that is formed on the substrate and couples the first tunable qubit to the first dissipative element;
a first resonator that includes the first dissipative, wherein when the first tunable qubit is tuned to a second flux value, the first tunable qubit is enabled to transfer energy associated with the one or more excited states from the first tunable qubit to the first dissipative element such that the first tunable qubit is transitioned to the ground state and the first dissipative element is enabled to dissipate the energy associated with the one or more excited states to a portion of the substrate, and wherein each tunable qubit of the set of tunable qubits is coupled to a separate dissipative element of the set of dissipative elements via a separate coupling channel of the set of coupling elements such that a propensity of crosstalk between coupling channels of the set of coupling channels is decreased.

* * * * *